United States Patent [19]

Komeya et al.

[11] Patent Number: 4,660,881
[45] Date of Patent: Apr. 28, 1987

[54] ACTUATOR FOR MOVABLY SUPPORTED OBJECT

[75] Inventors: Seiji Komeya; Takahiro Yamana, both of Toyota; Eiji Inoue, Aichi, all of Japan

[73] Assignee: Kojima Press Industry Co., Ltd., Aichen, Japan

[21] Appl. No.: 704,487

[22] Filed: Feb. 22, 1985

[30] Foreign Application Priority Data

Sep. 27, 1984 [JP] Japan ................ 59-202225

[51] Int. Cl.$^4$ .................. B60N 3/12; F03G 1/00; F16D 57/02
[52] U.S. Cl. .................. 296/37.9; 224/281; 312/319; 312/333; 206/15; 185/39; 74/89.17; 188/290; 188/322.5
[58] Field of Search ............... 296/37.8, 37.9, 37.11, 296/37.12; 131/231, 241; 224/278, 281, 282; 312/319, 320, 330 R, 333; 206/1.5; 185/39; 74/89.17; 188/290, 322.5; 267/8 R; 49/379

[56] References Cited

U.S. PATENT DOCUMENTS

| | | | |
|---|---|---|---|
| 3,216,529 | 11/1965 | Lohr .................. | 185/39 |
| 3,494,205 | 2/1970 | Heese .................. | 74/89.17 |
| 4,462,630 | 7/1984 | Omata .................. | 296/37.9 |
| 4,463,831 | 8/1984 | Wakase .................. | 185/39 |
| 4,466,449 | 8/1984 | Summers .................. | 296/37.9 |
| 4,494,806 | 1/1985 | Williams et al. .................. | 312/333 |
| 4,550,470 | 11/1985 | Omata .................. | 267/8 R X |
| 4,576,252 | 3/1986 | Omata .................. | 188/322.5 X |

FOREIGN PATENT DOCUMENTS 57-102179 6/1982 Japan.
57-110186 7/1982 Japan.

Primary Examiner—Robert B. Reeves
Assistant Examiner—Dennis H. Pedder
Attorney, Agent, or Firm—Browdy and Neimark

[57] ABSTRACT

An actuator for a movably supported object, comprising a rack, a rotatable pinion engaging the rack, a biasing member disposed around the axis of the pinion and connected to the pinion, and a damper. The biasing member stores a biasing energy while the pinion is rotated in one direction by a movement of the rack in a first direction. The biasing member biases the pinion in the other direction with the stored biasing energy and thereby biasing the rack in a second direction opposite to the first direction. The damper is encircled by the biasing member and has a fluid chamber which contains a viscous fluid and is formed around the axis of the pinion. The damper further includes a rotary member which is rotated with the pinion and has a damper portion disposed in the fluid chamber. The viscous fluid provides a resistance to rotation of the damper portion and to rotation of the pinion in the above-indicated other direction. Also disclosed is a container device incorporating the actuator. The container device comprises a stationary retainer, and a container supported by the retainer movably relative to the retainer. The rack is fixedly supported by one of the retainer and the container, and the pinion is rotatably supported by the other of the retainer and the container.

15 Claims, 20 Drawing Figures

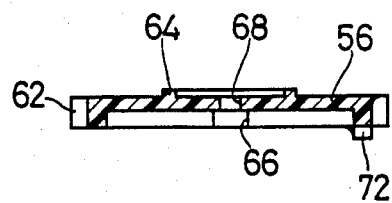
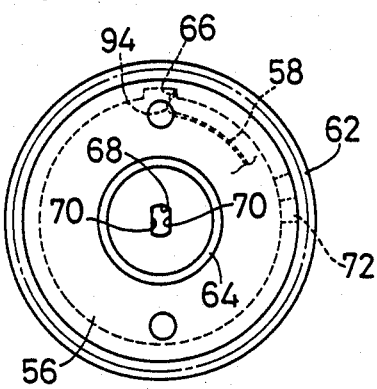
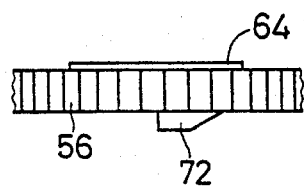
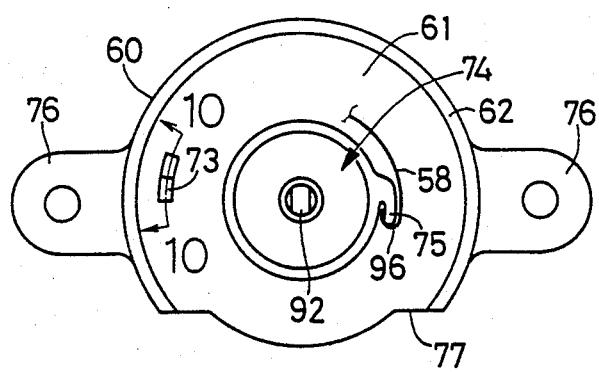
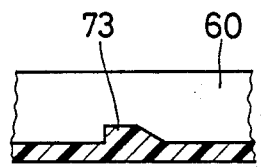
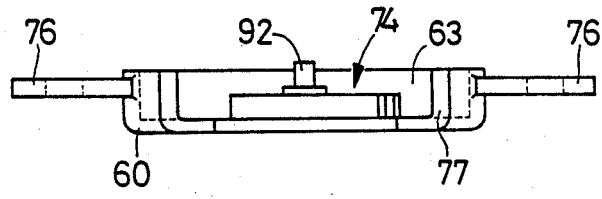

ACTUATOR FOR MOVABLY SUPPORTED OBJECT

BACKGROUND OF THE INVENTION

The present invention relates generally to an actuator, especially for a container device disposed in a vehicle such as an ashtray or a glove compartment which is equipped with the above indicated actuator. More particularly, the invention relates to a container device which allows a container to be automatically moved to its open position out of a predetermined container in which the chamber is stored.

In a commonly known automatic ashtray device which is one of container devices disposed in a vehicle and equipped with an actuator, an ashtray container serving as a container case is held within a predetermined chamber by a latching means which is disengaged as required to permit the ashtray container to be automatically moved to its open position out of the chamber by a biasing force of a spring member of an actuator. In recent years, there has been proposed an ashtray device the ashtray container of which is moved to the open position at a relatively low speed so that ashes and cigarette butts are not scattered out from the ashtray container.

This kind of ashtray device is disclosed in Japanese patent applications which were published June 25 and July 8, 1982 under Publication Nos. 57-102179 and 57-110186, respectively. These prior art devices all have damper means for damping an opening speed of the ashtray container, and a separate spring member acting as an element of an actuator. Therefore, the conventional ashtray devices, especially ashtray devices for automobiles, have a problem in that the producticity of the automobiles is reduced due to assembling of the ashtray device in the production line. They also have a problem in that since the damping means and the spring means must be mounted in different spaces, the ashtray device requires relatively large mounting spaces and a resultant dead space, which is unfavorable in the arrangement of other vehicle members.

SUMMARY OF THE INVENTION

It is therefore an object of the present invention to provide an actuator of a simple structure equipped with a damper function, particularly for an ashtray device, which has eliminated the above described inconveniences of the prior art. However, the invention may be embodied not only as an ashtray device but also have a wide range of applications as a container device such as a glove compartment.

Namely, the primary object of the invention is to provide an actuator having a simple construction and a compact size, and equipped with a damper function. Another object of the invention is to provide a container device disposed in a vehicle which allows an automatic movement of a container to its open position at a relatively low speed out of a predetermined storage space, and which permits high assembling efficiency in a production line and minimizes a dead space around the container.

To achieve the above indicated objects, there is provided an actuator for a movably supported object, which comprises a rack member extending along a line of movement of the object over a predetermined length, a pinion member supported rotatably about its axis and engaging the rack member, and biasing means disposed around the axis of the pinion member and connected to the pinion member. The biasing means stores a biasing force while the pinion member is rotated in one of opposite directions by a movement of the rack member in a first direction, and biases the pinion member in the other direction with the stored biasing force, thereby biasing the rack member in a second direction opposite to the first direction. The actuator further comprises damper means for damping the rotation of the pinion member in said other direction. The damper means includes portions defining a fluid chamber which contains a viscous fluid and which is formed around the axis of the pinion member, and further includes a rotary member which is rotated with the pinion member and which has a damper portion disposed in the fluid chamber. The viscous fluid provides a resistance to the rotation of the damper portion and to the rotation of the pinion member in the above indicated other direction.

In the above arrangement, the biasing means for moving the container to its open position upon disengagement of the latching means, and the damper means for maintaining the moving speed of the container at a moderate speed by damping the biasing force of the biasing means, can be assembled as a unit around the rotating axis of the pinion member and handled as one member, whereby the number of parts assembled in a production line can be reduced and the assembling efficiency can be remarkably improved.

The unitary assembly of the biasing means and the damper means has eliminated the requirement of separate mounting spaces for the biasing means and the damper means, whereby the overall mounting space required and a resultant dead space can be minimized.

According to one embodiment of the invention, the biasing means comprises a spiral spring. The spiral spring is fixed at its one end to the pinion member and at the other end to a stationary member supporting the object.

In the above embodiment, the actuator may further comprise a housing member which rotatably supports the pinion member. The pinion member comprises a pinion gear, and a lid member rotatable with the pinion gear and cooperating with the housing member to constitute a spring container which houses the spiral spring. The fluid chamber is defined radially inwardly of the spiral spring, by the lid member, the housing member and the spiral member. The lid member includes an annular flange portion serving as the damper portion of the rotary member. The annular flange portion extends into the fluid chamber such that the viscous fluid provides a resistance to the rotation of the annular portion.

According to an alternative embodiment of the invention, the damper means comprises a generally shallow-cup-shaped housing which includes an annular wall having a cutout in a portion thereof. The shallow-cup-shaped housing has the fluid chamber in which the damper portion of the rotary member is disposed. The housing cooperates with a stationary member to cover the pinion member except at a peripheral portion thereof at which the pinion member engages the rack member. The stationary member supports the object. The rotary member has a shaft portion which is coaxial with the axis of the pinion member and which has the damper portion at its one end. The shaft portion is coupled at the other end thereof to the pinion member to enable the rotary member to rotate with the pinion member.

In one form of the above embodiment, the generally shallow-cup-shaped housing has a chamber portion which cooperates with a central part of a bottom wall thereof to define the fluid chamber. The shaft portion of the rotary member extends through the chamber portion to engage the pinion member at the other end. The chamber portion and the annular wall of the shallow-cup-shaped housing define an annular space in which the biasing means is disposed. In this case, the damper portion of the rotary member may include at least one vane fixed to said one end of the shaft portion. The shaft portion has at the other end thereof a head which engages the pinion member.

According to one aspect of the invention, the actuator may be used for a container device disposed in a vehicle, which comprises a stationary retainer and a container supported by the retainer movably relative to the retainer. In this instance, the rack member is fixedly supported by the retainer or the container, and the pinion member is supported by the retainer or container which does not support the rack member.

In accordance with one embodiment of the container device indicated above, the container device may further comprise latching means for locking the container against the biasing force of the biasing means in a closed position thereof at which the container and the retainer cooperate to constitute an enclosure.

In the above embodiment of the container device, the container unlocks the container at the closed position when the container is pushed toward the retainer in the first direction.

In accordance with one form of the container device, the rack member is disposed on a lower surface of a bottom wall of the container, and the pinion member is supported by the retainer.

As described above, the rotating axis of the rotary member of the damper means is aligned with the rotating axis of the pinion member to directly connect the pinion member and the rotary member without using a damper gear between the pinion member and the rotary member, thereby eliminating the damper gear. Also, the rotary member and the damper housing, i.e., damper means, can be disposed on the same axis with the pinion member. Therefore, the damper means does not occupy a wide space in a radial direction of the pinion member, and a compact size of the acutator device has been realized.

Further, in the device constructed as described above, the housing of the damper means covers substantially the whole device except a portion engaging the rack member of the pinion member. Therefore, for example, various wires inside an instrumental panel of a vehicle, where the retainer holding the ashtray container is fixed, are not caught in the pinion member.

BRIEF DESCRIPTION OF THE DRAWINGS

The above and other objects, features and advantages of the present invention will be better understood from reading the following description of the preferred embodiments taken in connection with the accompanying drawing in which:

FIGS. 5-7 are a plan view, a side cross sectional view and a fragmentary side view, of a pinion member shown in FIG. 4, respectively;

FIGS. 8 and 9 are a plan view and a side view of a housing shown in FIGS. 1-4, respectively;

FIG. 10 is a cross sectional view taken along line 10—10 of FIG. 8;

DETAILED DESCRIPTION OF THE PREFERRED EMBODIMENTS

To further clarify the present invention, some preferred embodiments of an ashtray device used in a vehicle and equipped with an actuator of the invention will be described in greater detail, referring to FIGS. 1-14.

Figure 2:
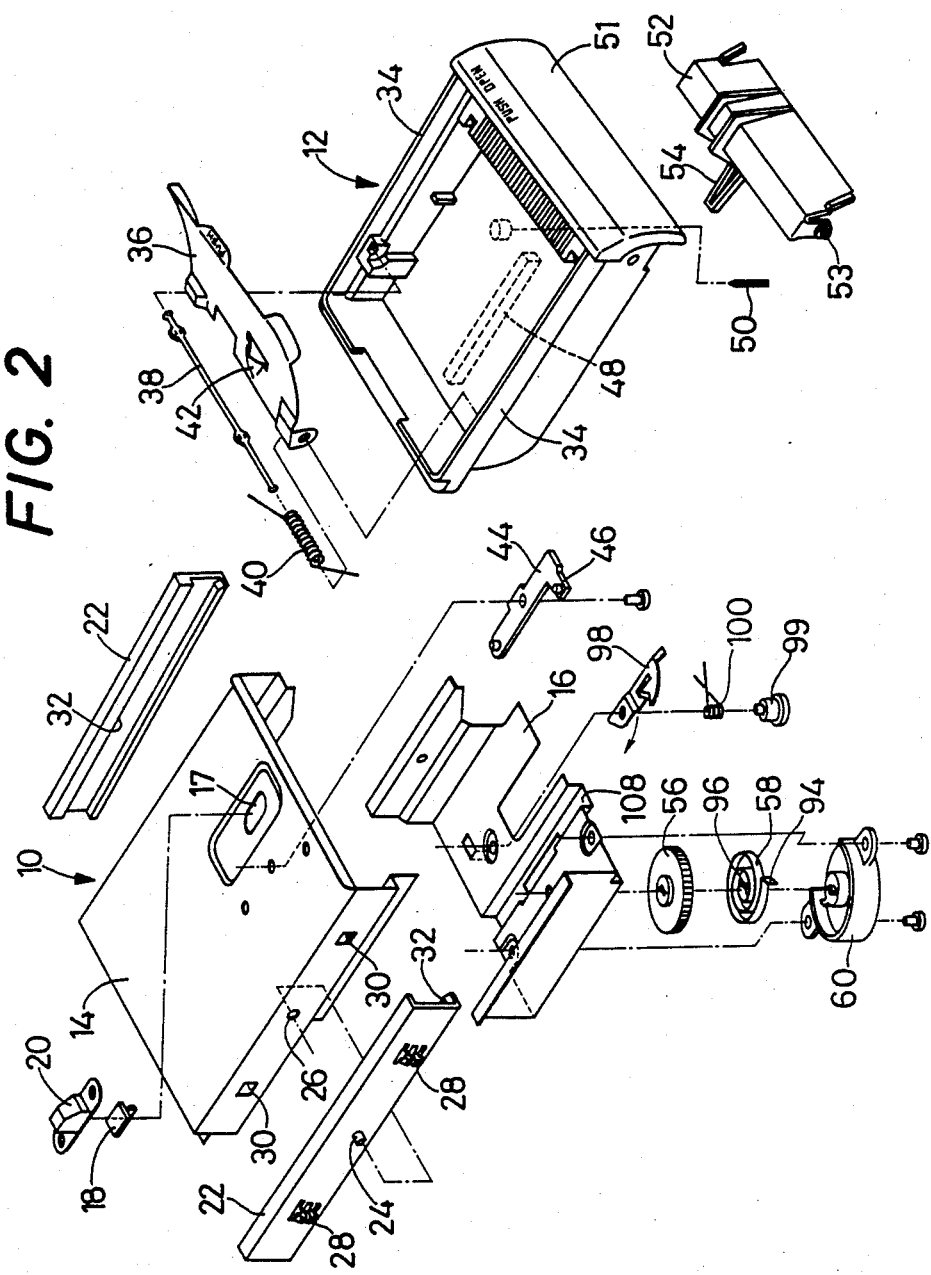
FIG. 2 is an exploded perspective view of an ashtray device disposed in a vehicle and incorporating the actuator device on FIG. 1.

There is shown in FIG. 2 a retainer 10 which is fixed to an instrument panel or the like of a vehicle to hold an ashtray container 12. The retainer 10 consists of a first member 14 and a second member 16 formed by bending steel plates. The first and second members 14, 16 are united by spot-welding side walls thereof. In a window 17 provided in a top wall of the retainer 10, an illumination casing 20 is fixed via a filter 18. On both side walls of the retainer 10, a pair of guide rails 22 are disposed in parallel to each other. Each guide rail 22 has a tab 24 and resilient pieces 28. The tab 24 is fitted into a hole 26 formed in the side wall of the retainer 10 so that the guide rail 22 is positioned to the side wall of the retainer 10, and the resilient pieces 28 are elastically fitted into apertures 30 to attach the guide rail 22 to the retainer 10.

The ashtray container 12 is made of a fire-resistant resin, and its side ribs 34 slidably engage grooves 32 of the guide rails 22. The ashtray container 12 is guided by the grooves 32 and the side ribs 34. On the top of the ashtray container 12 is mounted a protector plate 36 (for fire prevention) which is pivotable about a shaft 38 at its rear end and biased upwardly by a spring 40. The protector plate 36 has a stopper tongue 42 which projects upwardly therefrom. The stopper tongue 42 is adapted to abut on a stop 46 of a protector guide 44 fixed to the inner surface of the top wall of the retainer 10 so that the outward movement of the ashtray 12 to its open position is defined.

Figure 3:
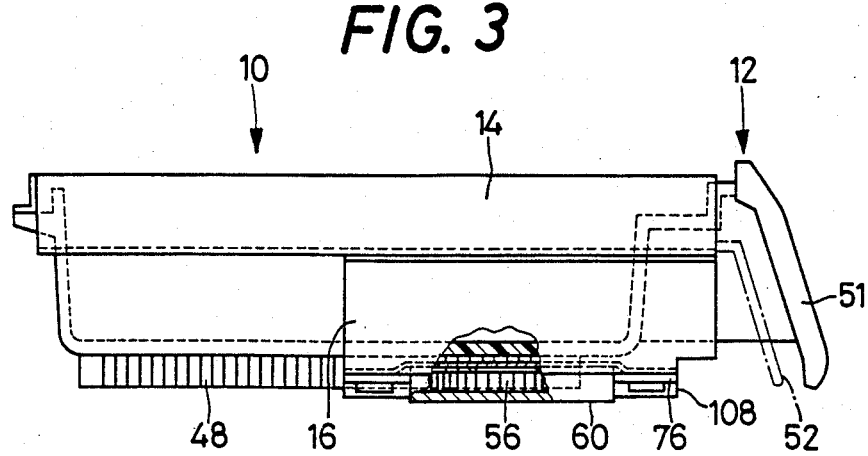
FIG. 3 is a partially cutaway side elevational view of the ashtray device shown in FIG. 2.

On a bottom surface of the ashtray container 12, there is fixed a rack 48 which extends in the direction of movements of the ashtray container 12, as shown in FIG. 3. Provided in the vicinity of the rack 48 is a latch pin 50 constituting part of a latching mechanism which locks the ashtray container 12 at its closed position (storage position). Inside a handling portion 51 of the ashtray container 12, a release lever 52 for releasing the latch pin 50 is mounted pivotably about a pin 53. An actuator arm 54 is provided to effect a releasing operation.

On a bottom surface of the retainer 10, a cam plate 98 cooperating with the latch pin 50 to constitute the latching mechanism is pivotably mounted by a multi-diameter pin 99. The cam plate 98 is biased clockwise (as seen in FIGS. 1, 2, 4 and 13) by a spring 100 in FIGS. 1, 2, 4 and 13. A biasing force of the spring 100 and profiles of cam surfaces 102, 103 (FIG. 13) bring the latch pin 50 to a latch portion 104 so that the ashtray container 12 is locked at the closed position. To unlock the ashtray container 12 from the cam plate 98, it is only required to slightly push the ashtray container 12. When the ashtray container 12 is pushed, the latch pin 50 is disengaged from the latch portion 104 and the cam plate 98 is pivoted clockwise by the spring 100, thereby bringing the latch pin 50 to a sloped cam surface 106. Upon reaching the sloped cam surface 106, the top of the latch pin 50 slides on the sloped cam surface 106 by a biasing force of a spiral spring 58 which will be referred to later. The latch pin 50 is then released from the cam plate 98, whereby the ashtray container 12 is unlocked from the latch pin 50.

On the bottom wall of the retainer 10, a channel portion 108 is formed at a position adjacent to the above described cam plate 98, and accommodates the rack 48 which is fixed on the bottom of the ashtray container 12. In the vicinity of the channel portion 108, a pinion gear 56 and the spiral spring 58 are disposed inside a shallow cup-shaped housing 60.

Figure 4:
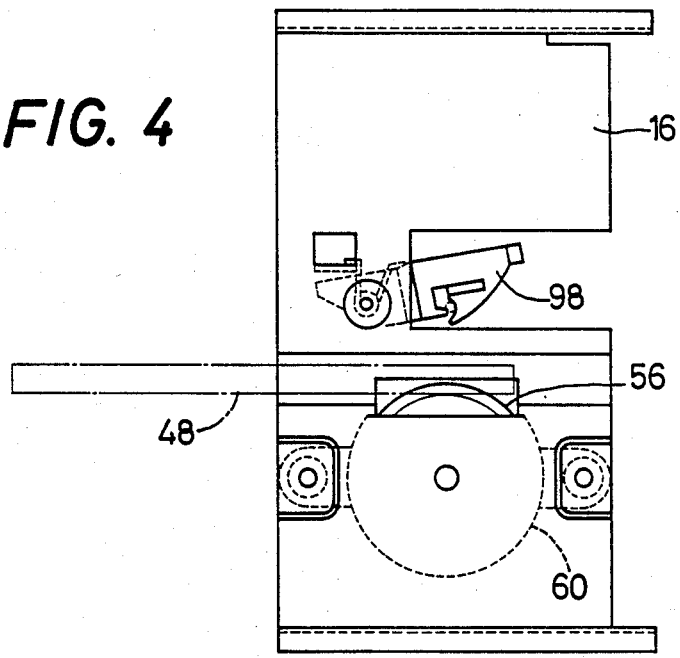
FIG. 4 is a top plan view showing part of the actuator device and a latching mechanism mounted on a bottom surface of a retainer illustrated in FIG. 3.

On the top surface of the pinion gear 56, as shown in FIGS. 5-7, an annular protrusion 64 having a rounded tip is formed coaxially with the rotating axis of the pinion gear 56. The pinion gear 56 is mounted, as shown in FIGS. 3 and 4, such that the round tip of the annular protrusion 64 is held in contact with the bottom surface of the second member 16 of the retainer 10, and such that a segment of the gear 56 projects into the channel portion 108 via an aperture of the second member 16 and engages the rack 48. The pinion gear 56 is shallow-cup-shaped, as shown in FIG. 6, so as to accommodate the spiral spring 58 in a preloaded state. The pinion gear 56 has, in its peripheral portion, an engagement recess 66 which engages an outer fixing end 94 (FIGS. 1 and 2) of the spiral spring 58. The biasing force of the spiral spring 58 is transmitted to the pinion gear 56 via the engagement recess 66, and then transmitted to the ashtray container 12 via the rack 48. As shown in FIG. 5, at a central portion of the pinion gear 56 is formed a center hole 68 which is provided with a pair of opposed parallel surfaces 70. On the bottom outer periphery of the pinion gear 56 is provided a stopper portion 72 which is abuttable on a stopper portion 73 (FIGS. 8 and 10) of the housing 60. When the pinion gear 56 rotates clockwise by a predetermined amount, the stopper portions 72, 73 abut on each other to prevent the pinion gear 56 from further rotating, whereby the transmission of the biasing force of the spiral spring 58 to the ashtray container 12 is shut off.

As shown in FIGS. 8 and 9, inside a central portion of a bottom wall 61 of the housing 60 is disposed a damper 74. The above stated pinion gear 56 and spiral spring 58 are contained in an annular space 63 between the damper 74 and an annular peripheral wall 62 of the housing 60. The housing 60 has a cutout portion 77 which, as shown in FIG. 4, is located opposite to the aperture of the retainer 10 (second member 16). That is, the housing 60 is disposed such that it cooperates with the retainer 10 to cover the pinion gear 56 except its peripheral portion engaging the rack 48. The housing 60 is fixed to the retainer 10 at its lugs 76.

Figure 11:
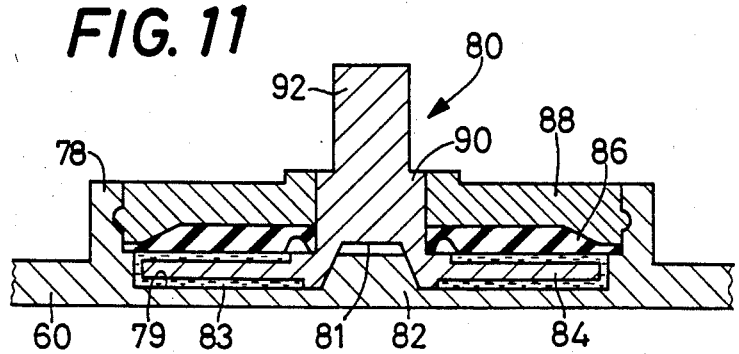
FIG. 11 is a fragmentary elevational view in cross section of a damper shown in FIGS. 1-4.
Figure 12:
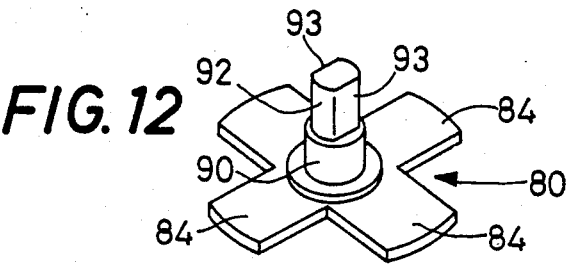
FIG. 12 is a perspective view of a rotary member shown in FIG. 11.
Figure 13:
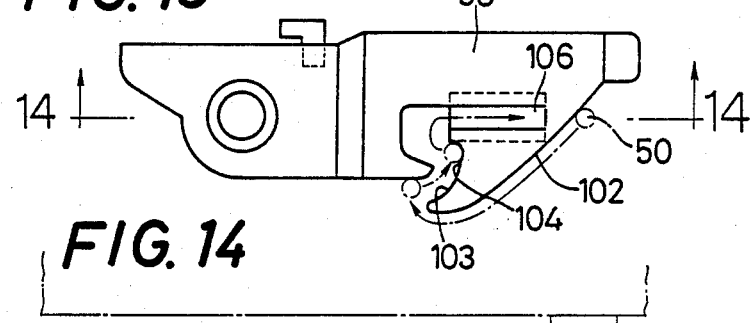
FIG. 13 is an enlarged plan view of a cam shown in FIGS. 1-4.
Figure 14:
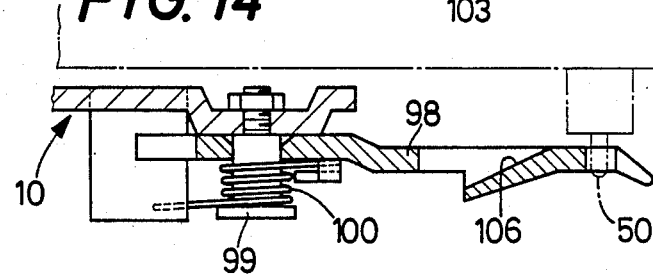
FIG. 14 is a side elevational view in cross section taken along line 14—14 of FIG. 13, illustrating a mounting status of the cam.

The damper 74 disposed inside the housing 60 includes an annular wall 78 as shown in FIG. 11. The annular wall 78 has an engagement hook 75 (FIG. 8) for holding an inner fixing end 96 of the spiral spring 58. Radially inwardly of the annular wall 78, there is formed a damper chamber 79 which is filled with a viscous fluid 83 and which partially accommodates a rotary member 80. As shown in FIGS. 11 and 12, the rotary member 80 includes a shaft portion 90 of a stepped cross sectional shape which is aligned with the rotating axis of the pinion gear 56, and vanes 84 projecting in a radial direction from a lower end portion of the shaft portion 90. The vanes 84 are disposed in the damper chamber 79 filled with the viscous fluid 83 so that a resistance of the viscous fluid 83 is applied to the vanes 84. The shaft portion 90 extends upwardly through a seal 86 and a cap 88 enclosing the damper chamber 79. The upper end portion of the shaft portion 90 is formed as a head 92 which engages the center hole 68 of the pinion gear 56. The head 92 has opposed parallel flat surfaces 93 which engage the opposed parallel surface 70 of the center hole 68 so that the rotary member 80 rotates together with the pinion gear 56.

Figure 1:
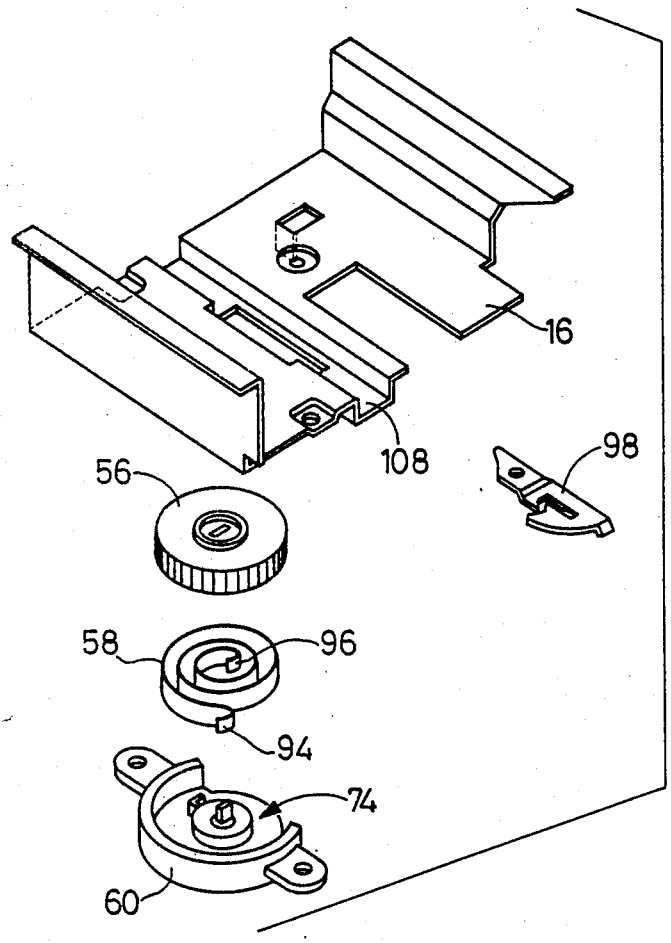
FIG. 1 is an exploded perspective view of one embodiment of an automatic actuator device of the present invention.

In the device constructed as described above, when the ashtray container 12 located at its open position is pushed inwardly toward its closed position, the pinion gear 56 engaging the rack 48 of the ashtray container 12 is rotated counterclockwise as viewed in FIGS. 1, 2, and 4, whereby the spiral spring 58 stores a biasing force. The ashtray container 12 pushed to its closed position is held at this position by the engagement of the latch pin 50 with the cam plate 98. In this state, the biasing force of the spiral spring 58 is applied to the ashtray container 12 via the pinion gear 56 and the rack 48. Therefore, when the latch pin 50 is disengaged from the cam plate 98 by slightly pushing the ashtray container 12 further from the closed position, the unlatched ashtray container 12 is moved outwardly towards its open position relative to the retainer 10, by the pinion gear 56 which is rotated by the biasing force of the spiral spring 58. At this time, the rotary member 80 of the damper 74 is rotated together with the pinion gear 56. However, since a rotary resistance is applied to the rotary member 80 by the viscous fluid 83, the rotation of the pinion gear 56 is damped. This rotary resistance allows the ashtray container 12 to move smoothly at a low velocity, thereby ensuring an excellent operating feeling and preventing cigarette butts or the like from coming out of the ashtray container 12.

When it is impossible to slightly push the ashtray container 12 from its closed position because the ashtray container 12 is filled with cigarette butts, etc., pivoting the release lever 52 causes the actuator arm 54 to lower the cam plate 98, whereby the latch pin 50 is forcibly disengaged from the cam plate 98.

As described above, in the device of this embodiment, the rotary member 80 disposed in the damper 74 is located in alignment with the rotating axis of the pinion gear 56, and its shaft portion 90 is directly connected with the pinion gear 56. Moreover, since the pinion gear 56 is configured to accommodate therein the spiral spring 58, the actuator consisting of the pinion gear 56, the spiral spring 58 and the damper 74 can be contained in the common housing 60, shallow cup-shaped whereby the automatic actuator device is constructed in a reduced size.

As mentioned previously, if a damper gear is secured to the rotary member of the damper and the rotary member is connected to the pinion gear by engaging the damper gear with the pinion gear, it is required that the axis of the rotary member be offset a certain distance away from the rotating axis of the pinion gear in a radial direction, which results in a larger size of the automatic actuator device. In the device of this embodiment, however, since the pinion gear 56 acts also as a damper gear, the damper gear is not required. Therefore, a compact automatic actuator device is realized. At the same time, the number of components of the device is reduced, and the number of assembling steps is also decreased because the assembling work is completed only by mounting the common housing accommodating the pinion gear 56 and the spiral spring 58, on the retainer 10.

Further, in the device of this embodiment, since the pinion gear 56 is contained in the common housing 60 together with the spiral 58 and the damper 74, and covered substantially entirely, there is no possibility that wires in an instrument panel of the vehicle is caught in the rotating pinion gear 56. Also, since the pinion gear 56 abuts, at its annular protrusion 64, on the bottom surface of the retainer 10, the pinion gear 56 can be rotated without shaky motions. Besides, since the annular protrusion 64 is in substantially linear contact with the bottom surface of the retainer 10, the pinion gear 56 has a small area of contact with the retainer 10. Therefore, the pinion gear 56 can rotated smoothly with a reduced resistance.

It will be appreciated that many changes and modifications can be made in the above described embodiment of the ashtray device, without departing from the spirit or scope of the invention.

For example, the annular protrusion 64 on the pinion gear 56 may be replaced by plural protrusions which are spaced from each other along a circle or circles having a center at the rotating axis of the pinion gear. In regards to the connection of the rotary member 80 of the damper 74 and the pinion gear 56, although the fitting method as described in the above embodiment is preferable for ease of assembly, the rotary member 80 may be directly fixed to the pinion gear 56, instead of the aforementioned engagement method.

An ashtray device equipped with another embodiment of the actuator of the present invention is illustrated in FIGS. 15-20.

Figure 15:
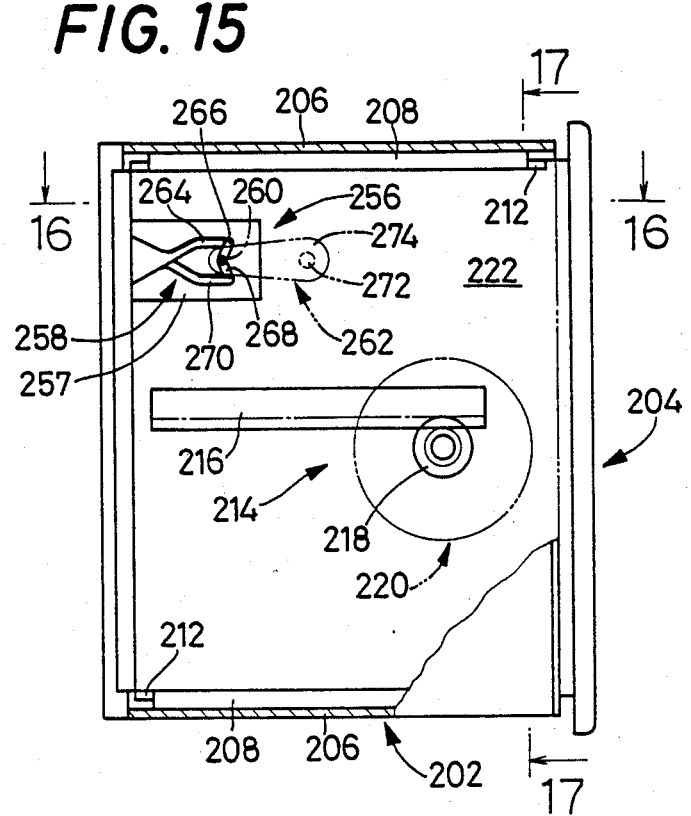
FIG. 15 is a bottom view of an embodiment of the ashtray device of the present invention.
Figure 16:
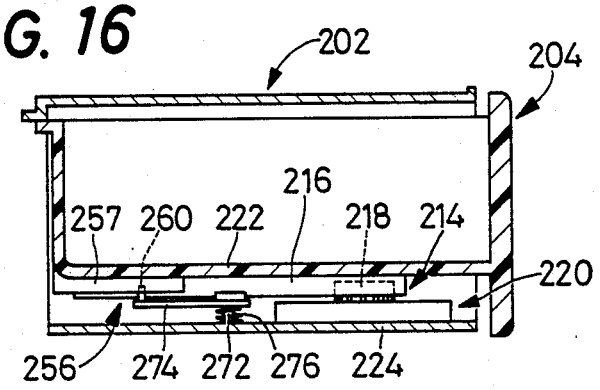
FIGS. 16 and 17 are a cross sectional view and a fragmentary cross sectional view, taken along line 16—16 and line 17—17 of FIG. 15, respectively.
Figure 17:
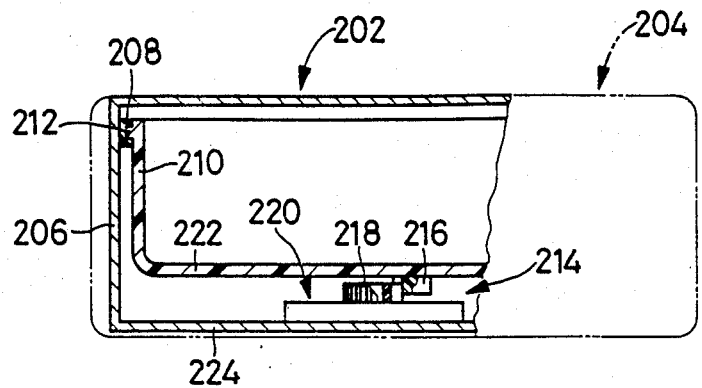

As shown in FIGS. 15-17, a retainer 202 supports container 204 to constitute an ashtray device. The retainer 202 is fixed inside an instrument panel of an automobile. In the vicinity of top end portions of inner surfaces of side walls 206 of the retainer 202, a pair of guide rails 208 are disposed so as to extend in a front to back direction, i.e., in the direction in which the ashtray container 204 is moved. In the vicinity of top end portions of outer surfaces of side walls 210 of the ashtray container 204, a pair of side ribs 212 are formed corresponding to the guide rails 208. The side ribs 212 slidably engage the guide rails 208 so that the ashtray container 204 is movable relative to the retainer 202.

In this embodiment, the ashtray container 204 slidably supported by the retainer 202 is designed to be automatically moved in a forward direction to its open position by an actuator mechanism 214 disposed therebetween.

The actuator mechanism 214 consists of a rack 216 provided on the ashtray container 204, and a biasing mechanism 220 having a pinion gear 218 disposed on the retainer 202. The rack 216 is formed integrally with a central portion of a bottom wall 222 of the ashtray container 204 such that the rack 216 extends along the line of movement of the ashtray container 204. The pinion gear 218 in the biasing mechanism 220 provided on the top surface of a bottom wall 224 of the retainer 202 is disposed such that the pinion gear 218 engages the rack 216 so that the ashtray container 204 is biased toward its open position.

Figure 18:
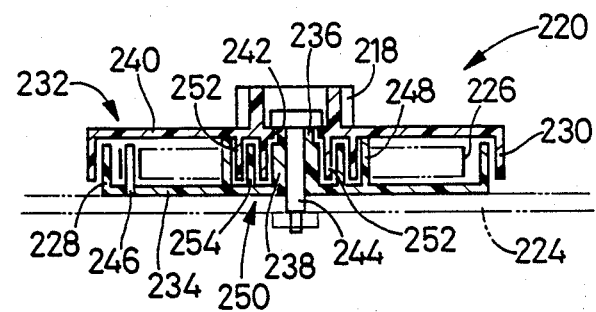
FIG. 18 is a cross sectional view of a biasing mechanism which exerts a biasing force on the pinion illustrated in FIG. 15.
Figure 19:
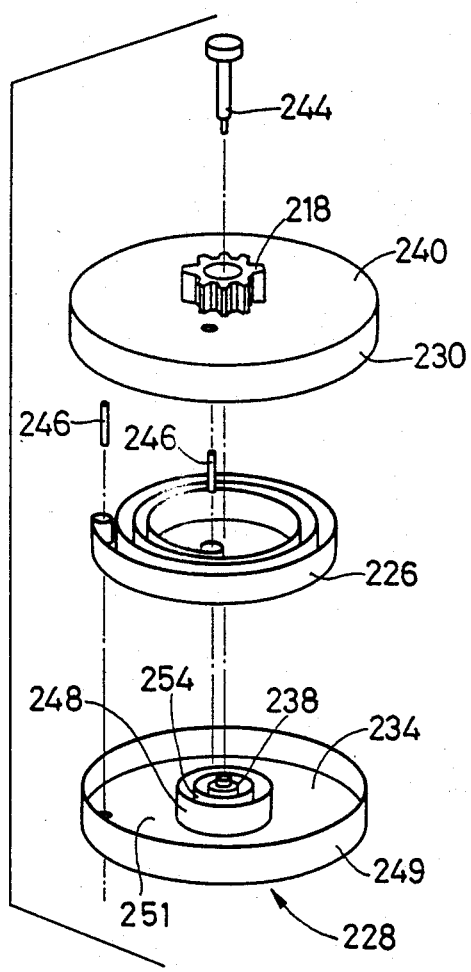
FIG. 19 is an exploded perspective view of the biasing mechanism.

As shown in FIGS. 18 and 19, the biasing mechanism 220 includes a spiral spring 226 used as a spring member. The spiral spring 226 is contained in a spring container 232 which consists of a housing member 228 having a generally shallow cup shape and a lid member 230 for covering the housing member 228.

In an inner central portion of a bottom wall 234 of the housing member 228 is formed a boss 238 having a small-diameter portion 236 at its end. In a central portion of a bottom wall 240 of the lid member 230, a throuhg-hole 242 is formed. With the through-hole 242 of the lid member 230 engaging the small-diameter portion 236 of the boss 238 of the housing member 228, the housing member 228 is fixed to the bottom wall 224 of the retainer 202 by a shaft pin 244 which penetrates through the boss 238. Namely, the lid member 239 is supported rotatably about the shaft pin 244 by the housing member 228 fixed to the retainer 202.

In the spring container 232 constructed as described above, ends of the spiral spring 226 are fixed to the housing member 228 and the lid member 230, respectively, by fixing pins 246 so that the biasing force of the spiral spring 226 is applied to the lid member 230. The pinion gear 218 engaging the rack 216 is formed on the outer surface of the top wall 240 of the lid member 230, integrally with the lid member 230 and concentrically with the through-hole 242, so that as the lid member 230 rotates about the shaft pin 244, the pinion gear 218 rotates about the shaft pin 244.

In this embodiment, therefore, since the biasing force of the spiral spring 226 is applied to the lid member 230 of the spring container 232 and then to the pinion gear 218, the rack 216 is moved to its open position. As a result, the ashtray container 204 is opened.

The above mentioned biasing force of the spiral spring 226 applied to the lid member 230 and to the pinion 218 is attenuated or damped so that the ashtray container 204 is moved to the open position at a low creeping speed.

To achieve this, the housing member 228 is formed with an annular primary partition wall 248 concentrically with the boss 238. The annular primary partition wall 248 cooperates with an annular peripheral wall 249 and the bottom wall 234 to define an annular space 251 for accommodating the spiral spring 226. The housing member 228 further has an auxiliary partition wall 254 which extends from the bottom wall 234, concentrically with and radially inwardly of the primary partition wall 248, so that the boss 238, and primary and auxiliary partition walls 248, 254 cooperate to define an annular fluid chamber 250 filled with a viscous fluid such as oil or grease. Two concentric annular rotating flanges 252 extend from the bottom wall 240 of the lid member 230 into the fluid chamber 250, concentrically with the partition walls 248, 254, one between the boss 238 and the auxiliary partition wall 254, and the other between the auxiliary partition wall 254 and the primary partition wall 248. In other words, one of the two annular rotating flanges 252 is located radially inwardly of the auxiliary partition wall 254, and the other flange 252 radially outwardly of the wall 254. When the lid member 230 is rotated relative to the housing member 228 about the pin 244 by the biasing force of the spiral spring 226, a resistance for restraining the rotation of the housing member 228 is applied via the rotating flanges 252 by the viscous fluid which fills the fluid chamber 250 defined by the rotating flanges 252, partition walls 248, 254, and the boss 238. Thus the biasing force of the spiral spring 226 is attenuated by the viscous resistance of the fluid, and the rotating force of the pinion gear 218 is damped, whereby the outward movement speed of the ashtray container 204 is kept low.

Normally, the ashtray container 204 is locked at its closed or storage position by the latching mechanism 256 which serves as latching means. As shown in FIGS. 15 and 16, the latching mechanism 256 consists of a cam groove 258 formed in a cam portion 257 at the rear bottom of the bottom wall 222 of the ashtray container 204, and locking means 262 equipped with a lock pin 260 which moves along the cam groove 258 and locks the ashtray container 204 at the closed position to prevent the motion of the ashtray container 204 toward its open position.

Figure 20:
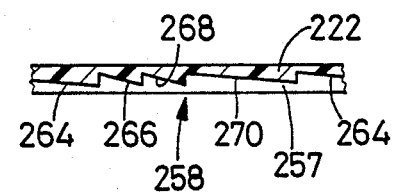
FIG. 20 is an illustrative view in cross section of a cam for latching means shown in FIG. 15, taken along a moving path of a lock pin relative to the cam.

As clearly illustrated in an illustrative view of FIG. 20 which shows the bottom profile of the cam groove 258 taken along a motion path of the lock pin 260 the bottom of the cam groove 258 has four slant surfaces 264, 266, 268 and 270 each of which is inclined downwardly toward the locking means 262 in a direction of movement of the lock pin 260. The slant surfaces 264, 266, 268, 270 are formed in a sawtoothed shape so as to constitute a closed path, as shown in FIG. 15. The slant surfaces 264 through 270 have different slanting directions from each other with respect to the direction of movement of the ashtray container 204. The locking means 262 is equipped with a lock plate 274 which is supported at its front end pivotably by a pin 272 fixed to the bottom wall 224 of the retainer 202. The lock plate 274 carries the above-described lock pin 260 at its rear end. Since the lock plate 274 is biased toward the ashtray container 204, i.e., upwardly by a coil spring 276 which is wound around the pin 272 and located between the ashtray container 204 and the bottom wall 224 of the retainer 202, the lock pin 260 may come into sliding contact with the slant surfaces 264 through 270 of the cam groove 258. When the lock pin 260 is disengaged from the cam groove 258 due to the movement of the ashtray container 204, the lock pin 260 on the upwardly biased plate 274 may be easily brought into engagement with the cam groove 258 again. Thus, the lock pin 260 repeats engagement and disengagement with and from the cam groove 258 when the ashtray container 204 is moved between its closed and open positions.

Namely, in this embodiment, the latching mechanism 256 and the actuator mechanism 214 are operated in combination to alternately allow the locking of the ashtray container 204 at the closed position, and the automatic outward movement of the ashtray container 204 to its open position, as described below in detail.

Firstly explained is the method of inserting the ashtray container 204 into the retainer 202 and moving it to the closed position.

When the ashtray container 204 is inserted into the retainer 202 by hand, the rack 216 engages the pinion gear 218. As the ashtray container 204 is moved backwardly, the pinion gear 218 is rotated. As a result, the spiral spring 226 is wound and stores a biasing energy, i.e., a force which causes the wound spring 226 to be unwound and restore its original natural state. When the ashtray container 204 is pushed inwardly to the vicinity of the closed position, the lock pin 260 on the locking mechanism 262 comes into sliding contact with the slant surface 264 of the cam groove 238. With a further movement of the container 204, the lock pin 260 is finally located at a junction between the leading end of the slant surface 266 and the trailing end of the slant surface 264. When the pushing pressure is released from the ashtray container 204, the ashtray container 204 is moved back or outwardly towards its open position by the biasing force of the spiral spring 226. At this time, since a stepped shoulder is formed between the slant surfaces 264 and 266, the lock pin 260 does not return along the slant surface 264, but moves in sliding contact with the slant surface 266 and reaches an intersection of the slant surfaces 266 and 268 which cooperate to form a V-shape as shown in FIG. 15. Since the intersection of the slant surfaces 266, 268 is the innermost end of the V-shape, the lock pin 260 cannot move further backwardly or inwardly of the ashtray container 204 after the lock pin 260 has been located at the intersection or junction of the V-shaped slant surfaces 266, 268. In other words, the ashtray container 204 is not moved further toward its open position despite the biasing force of the sprial spring 226, and consequently held in the closed position. An actual length of the slant surface 266 in the direction of movement of the ashtray container 204 may be extremely short. Therefore, an unfavorable gap between the front wall of the ashtray container 204 and the corresponding end of the retainer 202 can be easily avoided as by increasing the thickness of upper and lower portions of a front wall of the ashtray container 204.

To open and use the ashtray container 204, it is only required to slightly press the ashtray container 204 located in the aforementioned closed position.

When the ashtray container 204 in the closed position is pushed by hand, the lock pin 260 moves along the slant surface 268 and reaches the leading end of the slant surface 270. When the pushing pressure is released from the ashtray container 204, the actuator mechanism 214 moves the lock pin 260 along the slant surfce 270 by means of the biasing force of the siral spring 226, thereby automatically moving the ashtray container 204 in the opening direction toward its open position. The actuator mechanism 214 keeps moving the ashtray container 204 outwardly until the motion is stopped by a not-shown stopper mechanism. At this time, since the biasing force of the spiral spring 226 is damped by the viscous resistance caused by the viscous fluid as previously described, the moving speed is kept relatively low, thereby preventing cigarette butts, ashes and the like from being scattered from inside the ashtray container 204.

When the ashtray container 204 is located at the open position by the stopper mechanism, it is desired to hold the biasing force applied to the actuator mechanism 214, i.e., to have the spiral spring 226 remain biasing the ashtray container 204 to stably hold it in the open position. This is easily achieved by rotating the pinion gear 218 through engagement thereof with the rack 216 before the ashtray container 204 is located at its open position when the ashtray container 204 is inserted into the retainer 202. Alternatively, a positioning mechanism may be provided for holding the ashtray container 204 in the open position.

In order to return the ashtray container 204 from the open position to the closed position again, it is only required to push the ashtray container 204 inwardly toward the retainer 202. At this time, the rack 216 stores the biasing force in the spiral spring 226 via the pinion gear 218, and the latching mechanism 256 locks the ashtray container 204 in the closed position, in the manner as described previously.

In the ashtray device of this embodiment constructed as described above, the ashtray device can be opened or closed by simply pushing the ashtray container 204, and the opening speed of the ashtray container 204 is maintained at an appropriate low rate to prevent scattering of ashes, etc., thereby ensuring a smooth damped movements of the container 204. Since the biasing mechanism 220 of the actuator mechanism 214 for actuating the ashtray container 204 in the opening direction, is integrally assembled within the spring container 232, it is not required to separately mount a spring member and braking means for damping the biasing force, thereby considerably improving an assembling work of the ashtray device in a production line of the automobile.

For the above described reason, a mounting space and a resultant dead space are minimized.

While the present invention has been described in its preferred embodiments, it is to be understood that the invention is not limited thereto, but various changes and modifications may be made to the invention without departing from the spirit and scope of the invention.

For example, while the viscous resistance caused by the fluid is applied in the second embodiment, to the annular rotating flanges 252 extending into the fluid chamber 250, the rotating flanges 252 may not always be annular, but a plurality of fins may be disposed in mutually spaced-apart relation circumferentially of the lid member 230. Alternatively, protruding and recessed portions may be formed on an inner surface of the bottom wall 240 of the lid member 230 to receive the viscous resistance.

In the second embodiment, the fluid chamber 250 is formed radially inwardly of the spiral spring 226 to make the spring container 232 compact. However, the object of the invention may be achieved by forming the fluid chamber 250 around the spiral spring 226.

Further, the pinion gear 218 engaging the rack 216 may be formed on the cylindrical wall of the lid member 230. In this case, the overall thickness of the biasing mechanism 220 is reduced, resulting in a smaller dead space.

Also, in the second embodiment, the housing member 228 is fixed to the bottom wall 224 of the retainer 220 by the shaft pin 244, and the lid member 230 is rotatably held relative to the housing member 228. However, a pin for rotatably holding the lid member 230 relative to the housing member 228 and a bolt for fixing the housing member 228 to the retainer 202 may be separately provided.

Further, in the second embodiment, the rack 216 is disposed at a central portion of the bottom surface of the bottom wall 222 of the ashtray container 204, and therefore, an actuating force (biasing force) applied to the rack 216 is evenly transferred to the side walls 210 of the ashtray container 204 so that the ashtray container 204 is moved smoothly. However, the rack 216 may be disposed at any position on the bottom wall 222, or even on the side wall 210 of the ashtray container 204. In any case, as a matter of course, the biasing mechanism 220 is disposed so that the pinion gear 218 engages the rack 216. However, the biasing mechanism 220 may not be secured to the retainer 202 but may be installed on another member fixed to the vehicle.

In this sense, the present invention is applicable to a pivotable ashtray device wherein the ashtray container is opened or closed through its pivotal movements on a pivot. In this case, however, it is required to use an arcuate rack which is disposed on the side wall of the ashtray container along an arc of a circle having the center at the pivot axis.

In the second embodiment, the latching mechanism 256 serving as latching means consists of the cam groove 258 and the locking means 262. However, the latching means is not limited to the above indicated arrangement, but various types of latching means in the prior art may be utilized.

Further, an actuator of the present invention is applicable not only to the above described ashtray device but also to a container device such as a glove compartment, or a switch panel device wherein the switch panel is projected from its storage position, and not only to a linearly moved container device but also to a pivotal container described above.

It will be appreciated from the foregoing detailed description that various changes and modifications may be made to the embodiments without departing from the spirit and scope of the invention.

What is claimed is:

1. An actuator for an object, supported movably along a predetermined plane by a stationary member, comprising:
   a rack member extending along a line of movement of said object over a predetermined length;
   a pinion member supported rotatably about an axis thereof and engaging said rack member, said axis of said pinion member being perpendicular to said predetermined plane;
   damper means for damping the rotation of said pinion member in one of opposite directions, said damper means including portions defining a fluid chamber which contains a viscous fluid and which is formed around the axis of said pinion member, and further including a rotary member which is rotated with said pinion member and which has at least one damper vane disposed in said fluid chamber, said viscous fluid providing a resistance to the rotation of said at least one damper vane, and to the rotation of said pinion member in said one direction; and
   biasing means disposed around the axis of said pinion member and encircling said fluid chamber, said biasing means being connected to said pinion member at one end thereof and to said stationary member at the other end thereof, said biasing means storing a biasing force while said pinion member is rotated in the other of said opposite directions by a movement of said rack member in a first direction, said biasing means biasing said pinion member in said one direction with said biasing force, and thereby biasing said rack member in a second direction opposite to said first direction.

2. The actuator of claim 1, wherein said biasing means comprises a spiral spring.

3. The actuator of claim 1, wherein said damper means comprises a generally shallow-cup-shaped housing which includes an annular wall having a cutout in a portion thereof, said shallow-cup-shaped housing having said fluid chamber in which said at least one damper vane of said rotary member is disposed, said housing cooperating with a stationary member to substantially cover said pinion member and defining therebetween an aperture at a peripheral portion thereof at which the pinion member engages said rack member, said stationary member supporting said object, said rotary member having a shaft portion which is coaxial with the axis of said pinion member and which has said at least one damper vane at its one end, said shaft portion being coupled at the other end thereof to said pinion member to enable the rotary member to rotate with said pinion member.

4. The actuator of claim 3, wherein said generally shallow-cup-shaped housing has a chamber portion which cooperates with a central part of a bottom wall thereof to define said fluid chamber, said shaft portion of the rotary member extending through said chamber portion to engage said pinion member at said other end, said chamber portion and said annular wall of the shallow-cup-shaped housing defining an annular space in which said biasing means is disposed.

5. The actuator of claim 4, wherein said at least one vane of said rotary member is fixed to said one end of said shaft portion, said shaft portion having at said other end thereof a head which engages said pinion member.

6. A container device disposed in a vehicle, comprising:
   a stationary retainer;
   a container supported by said retainer and movable relative to the retainer, along a predetermined plane;
   a rack member fixedly supported by one of said retainer and said container, and extending along a line of movement of said container;
   a pinion member supported rotatably about an axis thereof by the other one of the retainer and the container and engaging said rack member, said axis of said pinion member being perpendicular to said predetermined plane;
   damper means for damping the rotation of said pinion member in one of opposite directions, said damper means including portions defining a fluid chamber which contains a viscous fluid and which is formed around the axis of said pinion member, and further including a rotary member which is rotated with said pinion member and which has at least one damper vane disposed in said fluid chamber, said viscous fluid providing a resistance to the rotation of said at least one damper vane, and to the rotation of said pinion member in said one direction; and
   biasing means disposed around the axis of said pinion member and encircling said fluid chamber, said biasing means being connected to said pinion member at one end thereof and to said other one of the retainer and the container at the other end thereof, said biasing means storing a biasing force while said pinion member is rotated in the other of said opposite directions by a movement of said rack member in a first direction, said biasing means biasing said pinion member in said one direction with said biasing force and thereby biasing said rack member in a second direction opposite to said first direction.

7. The container device of claim 6, further comprising latching means including a release lever and actuator arm for locking said container against said biasing force in a closed position thereof at which said container and said retainer cooperate to constitute an enclosure.

8. The container device of claim 7, wherein said latching means unlocks said container at said closed position when said container is pushed toward said retainer in said first direction.

9. The container device of claim 6, wherein said biasing means comprises a spiral spring.

10. The container device of claim 6, wherein said rack member is disposed on a lower surface of a bottom wall of said container, and said pinion member is supported by said retainer.

11. The container device of claim 10, wherein said damper means comprises a generally shallow-cup-shaped housing which includes an annular wall having a cutout in a portion thereof, said shallow-cup-shaped housing having said fluid chamber in which said at least one damper vane of said rotary member is disposed, said housing cooperating with a stationary member to cover said pinion member except at a peripheral portion thereof at which the pinion member engages said rack member, said stationary member supporting said object, said rotary member having a shaft portion which is coaxial with the axis of said pinion member and which has said at least one damper vane at its one end, said shaft portion being coupled at the other end thereof to said pinion member to enable the rotary member to rotate with said pinion member.

12. The container device of claim 11, wherein said generally shallow-cup-shaped housing has a chamber portion which cooperates with a central part of a bottom wall thereof to define said fluid chamber, said shaft portion of the rotary member extending through said chamber portion to engage said pinion member at said other end, said chamber portion and said annular wall of the shallow-cup-shaped housing defining an annular space in which said biasing means is disposed.

13. The container device of claim 12, wherein said biasing means comprises a spiral spring which is fixed at one end to said pinion member and at the other end to said shallow-cup-shaped housing.

14. The container device of claim 12, wherein said at least one vane of said rotary member is fixed to said one end of said shaft portion, said shaft portion having at said other end thereof a head which engages said pinion member.

15. The container device according to claim 6 wherein a latching mechanism is provided, the latching mechanism including a latch pin to lock said container at its closed position, and a release lever for releasing the latch pin, the release lever mounted pivotably about a pin, and an actuator arm substantially perpendicular to the release lever.

* * * * *